United States Patent
Bobier et al.

(10) Patent No.: US 7,023,932 B2
(45) Date of Patent: Apr. 4, 2006

(54) MODULATION COMPRESSION METHOD FOR THE RADIO FREQUENCY TRANSMISSION OF HIGH SPEED DATA

(75) Inventors: Joseph Bobier, Cudjoe Key, FL (US); Nadeem Khan, Satellite Town (PK)

(73) Assignee: XG Technology, LLC, Sarasota, FL (US)

( * ) Notice: Subject to any disclaimer, the term of this patent is extended or adjusted under 35 U.S.C. 154(b) by 0 days.

(21) Appl. No.: 10/766,556

(22) Filed: Jan. 28, 2004

(65) Prior Publication Data

US 2005/0007447 A1   Jan. 13, 2005

Related U.S. Application Data

(60) Provisional application No. 60/443,482, filed on Jan. 29, 2003.

(51) Int. Cl.
    *H03K 7/06*   (2006.01)
    *H03K 9/06*   (2006.01)

(52) U.S. Cl. ................ 375/271; 375/302; 375/322

(58) Field of Classification Search ............. 375/295, 375/272, 273, 276, 274, 303, 305, 340, 261, 375/298, 268, 269, 300, 320, 322, 323, 271, 375/316, 259, 302; 332/100, 103, 117, 149, 332/123–128; 329/127, 128, 300, 304, 315, 329/347

See application file for complete search history.

(56) References Cited

U.S. PATENT DOCUMENTS

| | | | | |
|---|---|---|---|---|
| 4,656,647 A | * | 4/1987 | Hotine | 375/279 |
| 5,909,460 A | * | 6/1999 | Dent | 375/130 |
| 6,968,014 B1 | * | 11/2005 | Bobier | 375/271 |
| 2002/0058484 A1 | * | 5/2002 | Bobier et al. | 455/108 |

* cited by examiner

*Primary Examiner*—Tesfaldet Bocure
(74) *Attorney, Agent, or Firm*—Dennis L. Cook, Esq.

(57) ABSTRACT

The invention disclosed in this application discloses a method for modulating and demodulating compressed binary information that was derived from a binary information stream composed of a binary data sequence of first and second binary states that was modulated onto a carrier which has a waveform with a continuous sequence of wavelets with similar amplitudes defined by a 360 degree cycle between crossover positions representing a substantially zero energy level in which the carrier has been modulated in accordance with said binary data sequence by grouping said wavelets into wavelet groups containing two or more wavelets, receiving said information stream as a binary data sequence of first and second binary states; grouping said binary data sequence of first and second binary states into binary groups of two or more first and second binary states; correlating one of each said wavelets in said wavelet group with one of each possible binary values of each said binary groups, modulating said carrier in accordance with said binary data sequence by altering the amplitude or frequency of the one of each said wavelets in said wavelet groups corresponding to one of each said binary values of said binary groups resulting in a compressed binary modulated carrier, demodulating said compressed binary modulated carrier by detecting the respective amplitudes or frequencies of said wavelets to identify said altered wavelets in said wavelet groups and correlating to said binary values of said binary groups, and reconstructing said binary data sequence from said binary groups resulting in regeneration of said information stream.

14 Claims, 9 Drawing Sheets

*An un-modulated carrier.*

*A carrier with 16 cycles counted out to define a frame of data.*

*The RF cycle in position three is (exaggerated) longer in period.*

FIGURE 5

| Relative Index Position | Representative Binary Pattern |
|---|---|
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| 10 | 1001 |
| 11 | 1010 |
| 12 | 1011 |
| 13 | 1100 |
| 14 | 1101 |
| 15 | 1110 |
| 16 | 1111 |

Index position verses indicated binary pattern.

*A carrier with 15 cycles counted out to define a frame of data.*

*The RF cycle in position three is (exaggerated) longer in period.*

FIGURE 8

| Relative Index Position | Representative Binary Pattern |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
| (no modulation) | 0000 |

Index position verses indicated binary pattern.

MODULATION COMPRESSION METHOD FOR THE RADIO FREQUENCY TRANSMISSION OF HIGH SPEED DATA

CROSS-REFERENCE TO RELATED APPLICATION

The present application claims the benefit of previously filed co-pending Provisional Patent Application, Ser. No. 60/443,482 filed Jan. 29, 2003.

FIELD OF THE INVENTION

This invention addresses the need to transport high bit-rate data over wired or wireless means using modulated radio frequency carrier waves. Specifically, the invention provides a compression method for various methods of modulation by which the spectral channel width occupied by the radio signal can remain very narrow even though the data bit-rate, which is used as the modulating signal, may be very fast, including data bit rate speeds up to and surpassing the frequency of the carrier itself.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:

1. Frequency Division Multiple Access (FDMA)
2. Time Division Multiple Access (TDMA)
3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

It is well known by those skilled in the art that a radio signal consists of at least one electromagnetic energy packet. These packets are comprised of both an electrical field and a magnetic field traveling through space. The mathematical description of each field is that of a sinusoidal shape, with each field conjoined in a transverse relationship, mutually dependant upon one another as shown in FIG. 1.

In the traditional usage, when these packets (photons) are generated together into a continuum of sequential sine waves, we have what is referred to as a radio carrier, which if constituted of identical packets, is said to be un-modulated. For the radio spectrum to be pure, which consists of only one single and narrow radio channel when plotted on a spectral diagram, the packets are conjoined temporally so that as the phase angle of a preceding packet crosses the zero-degree end point, the proceeding packet is just beginning at the zero-degree angle. Thus from the perspective of the observer, a continuous 360 degree undulation of both electrical and magnetic fields would be observed.

Any radio system in use today will modify large groups of these conjoined packets in one or more ways to convey information. For example, a modem wireless phone might transmit near a frequency of 1.9 GHz and modulate the carrier at a rate of about 6 KHz to achieve a data throughput of 14.4 kbps. In this example, a portion of the carrier, consisting of about 316,366 individual sine waves is modified as a group to represent a single binary bit.

To represent the simplest form of communication, the binary system, there are several ways to alter at least one of the following four characteristics of the continuum of sine wave packets (referred to herein as sine waves) to indicate to the receiving mechanism that a binary one or zero is conveyed.

Sine waves can be modified in at least the following four basic ways:

1. Amplitude: The amplitude of the electrical and magnetic fields can be increased or decreased to cause either a larger or smaller signal to be detected at the receiving device. The change in amplitude can represent the conveyance of a binary one or a binary zero or even a change in binary state when the previous state is already known.
2. Frequency: The period of the individual sine waves within a group can be increased or decreased to make the same representation as in example one above. This is also called frequency modulation.
3. Interruption: The continuum of sine waves can be interrupted, then re-established to indicate a zero or one condition, or as in example one and two above, the interruption could represent a change in logic state assuming the previous state was known. This is sometimes known as CW or Pulse code modulation.
4. Phase: The phase of a group of sine waves could be altered so that the sine waves are in fact not sine waves any more. They now consist of an amalgamation of two or more frequencies, whose presence indicates the conditional change in logic state.

Many modulation techniques now exist that use any of the above methods either singularly or in combination. Lately a mixing of these methods has been in popular use because by modifying more than one characteristic, more than one single logic state can be represented. For instance the Quadrature Amplitude Modulation system (QAM) can combine the use of both amplitude and frequency modulation to represent multiple binary combinations.

Even though binary data stream transmission by wire has improved substantially in terms of data transfer rates, that improvement has not been the case where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

It is also well recognized by those skilled in the art that in modem radio communications a troubling problem exists in the utilization of spectrum. Many radio communication services exist to support the market needs of many diverse users. Government agencies regulate the usage of radio spectrum among such diverse users as government, military, private business, radio common carriers (RCC) and unlicensed individual users. The need for radio spectrum is an immense problem. The problem is compounded because modem radio systems transport binary digital information using modulation methods that are merely adaptations of methods that were originally designed for conveyance of analog information. Namely, voice, music and video transmissions, which were the sole forms of information in the 20th century, are now quickly being replaced with digital representations of the same. Added to this is the need to allow the user to access digital information from the Internet, corporate databases and other sources. Truly this is a modem problem. Since the means of modulating the radio carrier are still the same as those used in the past the amount of spectral width required by individual transmitters is ever increasing. Well-known theories of modulation define these modulation systems and dictate that as the amount of information increases in a given modulated stream, the number of spectral byproducts, called sidebands will increase. For instance, using common methods of radio modulation, a typical channel width for a digital transmission will be about ½ of the rate of binary state change. Applied in real terms, a radio transmitter that is conveying information at a rate of 100 kilobits per second (KBPS) will require a clear section of radio spectrum of about 50 KHz of width, with the carrier at the center of the channel. In this age, 100 KBPS is a low rate of data transmission, so in practice many services are requiring huge allocations of the limited spectrum resource.

A solution is required that will allow the maximum amount of information to be conveyed, while consuming the least amount of spectral width.

The compression method of this disclosure improves the performance various modulation techniques and helps alleviate this massive and growing problem.

BRIEF SUMMARY OF THE INVENTION

The compression method of this invention, hereinafter called Index-N, describes a data compression system for use with binary modulation systems. Its purpose is to reduce the number of radio carrier modulation events, thus reducing the amount of radio sideband emissions, while increasing the amount of information conveyed.

The embodiments of the compression method invention disclosed in this application is described as applied to a method of modulation named Integer Cycle Frequency Hopping (ICFH) but could be used on any number of modulation methods. A description of the ICFH technique follows:

- A carrier signal, comprised of a continuum of sine waves is generated on a single frequency.
- A data bit representing either a "1" or a "0", depending upon the logic polarity chosen by the builder is imposed upon the carrier signal by modifying the carrier signal at precisely the zero crossing point or the zero degree angle. The method of imposing the data is to cause either a lengthening or shortening of the proceeding 360 degrees of phase angle, thus effectively either raising or lowering the frequency of the carrier signal for just the one cycle at hand.
- Upon completion of the 360-degree cycle, the carrier will return to the original frequency.
- The following parameters define ICFH:
- The main carrier frequency is only modulated beginning at the zero degree phase angle and ending at the 360-degree phase angle.
- As few as one sine wave cycle can be used to represent one data bit.
- The spectral output of a transmitting device using this modulation scheme will be defined by the difference in frequency between the main carrier signal and the modulating frequency.
- A modulated segment of the main carrier frequency can represent either a binary "1" or a binary "0".

A compression method applied to the ICFH invention, or other methods of modulation, is now disclosed wherein multiple modulating frequencies are utilized to represent multiple logic conditions thus creating a binary data compression method to be used in RF transmissions.

Index-N describes a data compression method for use with binary modulation systems. It reduces the number of radio carrier modulation events, thus reducing the amount of radio sideband emissions, while increasing the amount of information conveyed by a factor of 400%. Additionally it will be shown that Index-N can simplify receiver design by incorporating a synchronous data clock into the carrier signal itself without adding any additional payload overhead or adding to the number of modulation events.

The invention accordingly, comprises the compression technique and the methods possessing the steps, which are exemplified in the following detailed description.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the following detailed description, taken in connection with the accompanying drawings, in which:

FIG. 5 is a chart showing index position verses indicated binary pattern in accordance with the preferred embodiment of the invention.

FIG. 8 is a chart showing index position verses indicated binary pattern in accordance with an alternative embodiment of the invention.

DETAILED DESCRIPTION OF THE INVENTION

Figure 1:
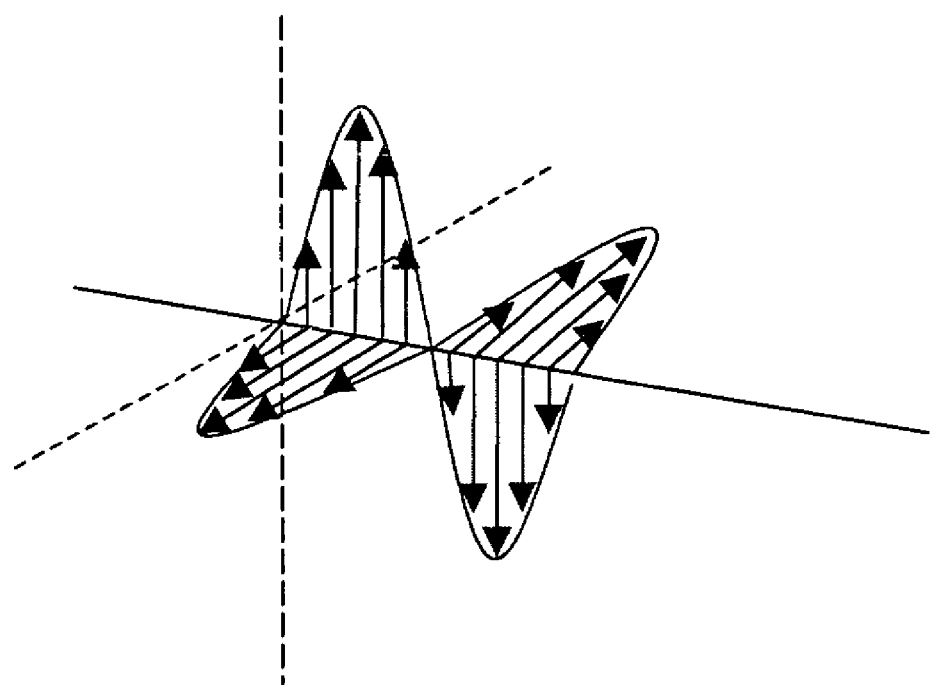
FIG. 1 is a representation of a single packet of electromagnetic energy.

In patent application Ser. No. 09/511,470 filed by Joseph Bobier (a co-inventor of this patent application), the contents of which are incorporated herein, a new method of carrier modulation referred to as "missing cycle modulation" (MCM) was disclosed. That method of modulation uses an RF carrier comprised of a continuum of full cycle sinusoidal wavelets extending between zero crossover points or positions, and that carrier is then modulated to carry binary information by selectively deleting one or a succession of carrier wavelets. Such a deletion may be assigned to represent either a binary one or zero value. The deletional modulation is carried out by the removal, by switching, of data related wavelets at the sinusoidal zero crossing positions defining them.

Inasmuch as these zero positions correspond with the absence of electro-magnetic wave energy, no wave disturbances are invoked which, would in turn, produce side frequencies. As a consequence, the assigned carrier frequencies may be quite close together in value to provide a substantially improved utilization of the radio spectrum for binary data transmittal.

In a related patent application Ser. No. 09/916,054 also filed by Joseph Bobier (a co-inventor of this patent application), the contents of which are incorporated herein, the deletional modulation of the original invention was modified to merely suppress the amplitude of the cycle resulting in suppressed cycle modulation (SCM). This type of modulation is accomplished when the carrier is amplitude modulated with a modulation signal that is equal in frequency to the carrier itself and the modulation always begins or ends upon the exact zero voltage crossing point of the RF cycle phase. The modulation is applied as a shift of the amplitude of any single cycle, each cycle representing a single bit of data. In SCM, each individual RF cycle represents one bit of data. A single cycle of RF will either represent a "1" or "0" depending upon the amplitude of the cycle, relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely, a cycle that is relatively lower in amplitude than other cycles in the bit stream might be considered to represent a "0".

In a related patent application filed Jan. 27, 2003 (Ser. No. 60/442,716), also filed by Joseph Bobier (a co-inventor of this patent application), the contents of which are incorporated herein, Integer Cycle Frequency Hopping (ICFH) modulation, a unique method of radio frequency modulation, was disclosed. The purpose of that method was to cause a radio frequency carrier to convey information in a manner that will utilize the minimum radio spectrum bandwidth while simultaneously conveying information at the highest possible rate.

ICFH is based upon the premise that individual photons, when used in the portion of the electromagnet spectrum referred to as radio, can be emitted and detected individually, and that these individual emanations can be used to represent individual messages in the form of binary numbers.

It was in the Nobel Prize winning disclosure by Albert Einstein that it was taught that photons of light, now understood to encompass all electromagnetic radiation, are self-contained packets of energy. Each photon can act as both a particle or a wave, depending upon the relative position of the observer. Each photon is a self-contained unit, requiring no other photons to exist. In this disclosure the terms "sinewave" and "packet" are used interchangeably. Thus we can extrapolate that just as photons of light can be emitted and detected individually and in isolation, photons of longer period, what we refer to as radio waves, can be likewise utilized. ICFH uses this concept to reduce the number of photons used in radio communication to an individual basis. ICFH relies upon the single sine wave (or packet) to represent the most basic piece of information, the binary digit. In the simplest form, an ICFH transmitter will emit one single sine wave to represent one single binary event. In one embodiment, single emissions of sine waves of a given radio frequency represent one binary state, while single emissions of sine waves of another radio frequency are emitted to represent the alternative binary state. Therefore it can be said that the purest and simplest natural form of electromagnetic radiation, the single sine wave of radio energy, represents the simplest form of information conveyance, the binary digit.

ICFH embodies the following minimum set of characteristics to convey information while consuming the least amount of spectral channel width.

1. A transmitter on an individual basis, each single sine wave representing a binary bit, emits sine waves.
2. Sine waves of a different period (frequency) are emitted individually to represent the alternative binary logic state.
3. Each emitted sine wave is complete, undistorted in phase, amplitude or any other imperfection.
4. Regardless of frequency or logic representation, each sine wave is preceded and proceeded by another sine wave and the individual sine waves are conjoined so that there is no lapse of time or phase degree angle.
5. All sine waves are equal in amplitude.

Thus a radio transmission from a ICFH transmitter will contain very few harmonic components, because there is little disturbance to the continuum of sine waves as seen by an observer. Since under a ICFH rule set, each sine wave will represent one bit of information, the rate of information conveyance is equal to the frequency of the radio signal.

In practical uses, the signal consists of at least two radio frequencies, separated by some spectral distance. Thus, we have a continuum of sine waves, some having a period equating to frequency "A" and some having a period equating to frequency "B". These sine waves of disparate frequency are joined at the beginning or ending zero degree phase angles and form a continuous carrier of steady amplitude. In actual embodiments, this carrier must be decoded so that sine waves are recognized for the individual frequencies of which they are formed. It is the purpose of the demodulator in the receiver to do this and from the period of each sine wave determine the assigned representation of the sine wave as a binary one or zero.

Thus, a series of RF signals and modulation techniques, which can be called integer cycle modulation methods, have been disclosed that have the benefits of very minimal channel width requirements, no connection between information rate and the channel width and the ability to transport data at a rate commensurate with the radio frequency. In the ICFH disclosure the spectral separation of the radio frequencies used determines the spectral width of the channel overall. This is antithetic to usual methods of modulation, which increase the channel width as a factor of the rate of data conveyance.

As digital modulation schemes proliferate in the radio communications industry, it has become necessary to reduce the spectral bandwidth consumed by radio transmission systems while increasing the amount of information conveyed by the same systems. Now a further novel means by which the rate of data throughput can be increased four fold while the number of modulation events has been reduced the same amount has been devised. The system, called Index-N, can be used with many typical modulation systems, but has been particularly useful in systems that use single cycle modulation methods such as described above. Systems such as Missing Cycle Modulation (MCM), disclosed by Bobier and Integer Cycle Frequency Hopping (ICFH), by Bobier and Khan have particularly benefited in that these systems easily incorporate the embedded synchronous clock function of Index-N.

The continuum of sine waves inherent in single cycle modulation methods, in addition to being comprised of individual packets of two separate periods, can also consist of packets of multiple periods. For instance, a carrier that consists of packets of four different periods can a form a data compression system. That is to say that the emission of a sine wave of period "A" might represent a binary combination of "00" while the emission of packet with period "B" might represent binary pattern "01" where a packet of period "C" might represent binary pattern "10" and finally, a packet with a period of "D" could represent binary pattern "11". Thus simply choosing a number of periods to be used in the encoding scheme can multiply the binary patterns that are possible. This allows the actual rate of data conveyance to exceed the carrier frequency, while maintaining a minimal number of radio sidebands and virtually no increase in the width of the occupied radio spectrum.

Additionally it will be shown that Index-N can simplify receiver design by incorporating a synchronous data clock into the carrier signal itself without adding any additional payload overhead or adding to the number of modulation events.

Index-N uses the radio carrier itself to serve multiple functions simultaneously without adding unnecessary signaling overhead.

The carrier can be used as a synchronous clock. The radio carrier itself is a stable and reliable source of clock information. By counting the individual RF cycles and dividing where necessary, the receiver is able to derive a clock signal that is originally formed by the radio transmitter. Thus received data is easily correlated to the received modulation events and used as a receive system clock for the recovery of the data information. Depending upon the type of modulation used within the system, the need to transmit coordination or timing marks can be eliminated, therefore eliminating the need to add this information to the modulation overhead. This preserves crucial RF bandwidth for the data itself. The benefit of this incorporated clock will become apparent in the following discussion of the mechanics of Index-N.

As discussed above, the need to reduce modulation events in order to reduce spurious radiation is paramount in today's crowded radio spectrum. The use of Index-N will provide great enhancement to the spectral performance of most digital radio systems. We define a modulation event as any action that modulates or modifies the un-modulated RF carrier in order to cause it to convey information. While many well-known forms of carrier modulation are compatible with Index-N, our discussion here will show how it is used with ICFH.

Figure 2:
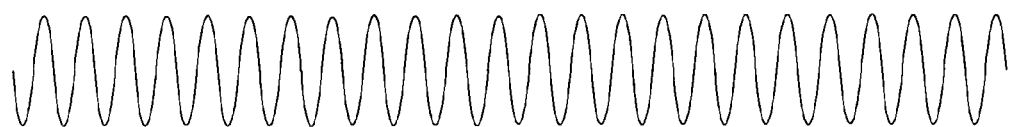
FIG. 2 is a representation of an unmodulated carrier.

Suppose the ICFH transmitter transmits an un-modulated carrier. In this system (ICFH) individual carrier cycles are used to convey data and each cycle can be modified in frequency to represent one or more binary data bits. See FIG. 2.

The individual cycles can be counted by the radio receiver circuitry. Depending upon the data format, these can be used to calculate data frame boundaries, etc. When used in Index-N enabled systems, the clock count is used to count frames of, for example, 16 potential modulation events. Specifically, when used in SCFH systems, each cycle represents a potential modulation event, so referring to FIG. 3, 16 cycles are grouped into a frame.

Figure 3:
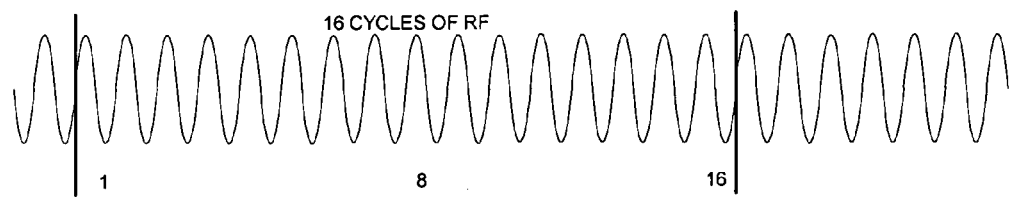
FIG. 3 is a representation of a carrier with 16 cycles counted out to define a frame of data in accordance with the preferred embodiment of the invention.

In the example of FIG. 3, all cycles are the same amplitude or frequency, so no modulation event is detected. This frame is received and decoded as containing a null value. However in single cycle applications, any one of the cycles could have been modulated in phase, frequency or amplitude. When used with the Index-N system, only one of the cycles could have been modified. In that case, the clock count forms an index pointer, working on a modulo 16 base. At the beginning of each frame, the count will reset to 1 and increment though the frame as each cycle is received to a count of 16. If at some point in the count the receiver detects a modified cycle, the index at that cycle will indicate the binary value of a four-bit nibble.

Figure 4:
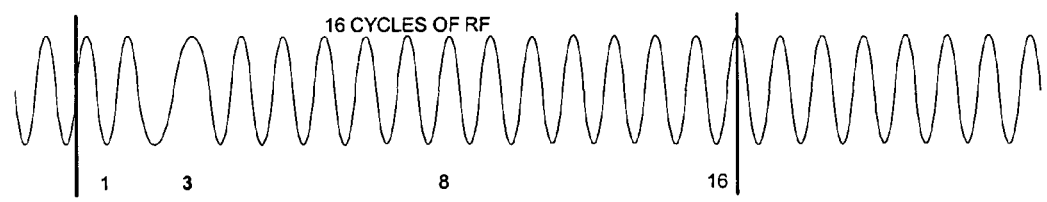
FIGS. 4, 4a, and 4b are representations of a carrier with the RF cycle in position three modulated in accordance with the preferred embodiment of the invention.
Figure 4A:
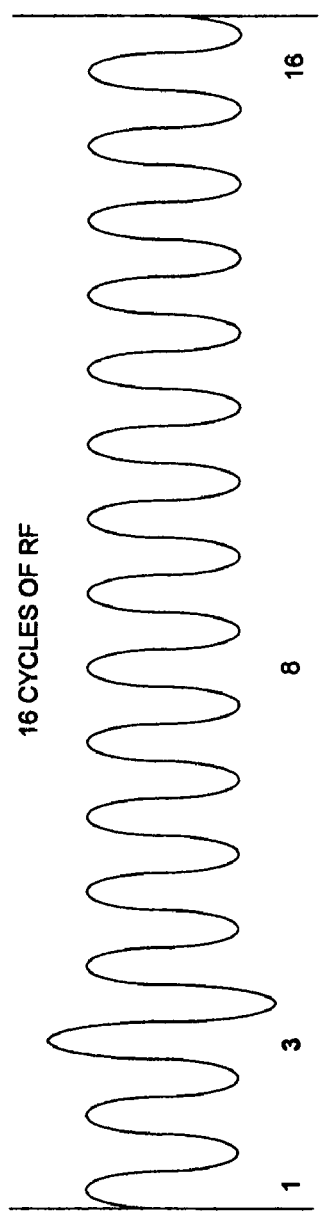
Figure 4B:
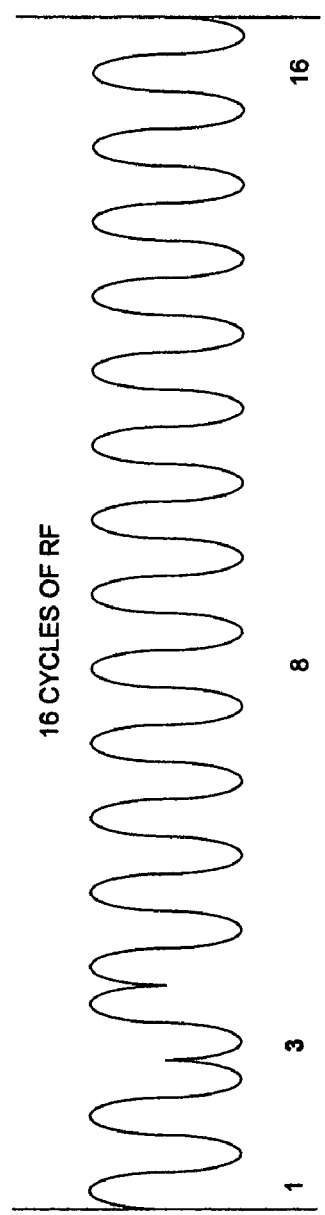

In FIG. 4, for example, the RF cycle of position three (index count of three) has a longer period, therefore is of a lower frequency than the other un-modulated cycles. The receiver will detect this single aberrated cycle and note that it is in index position three. This is decoded therefore as a binary "0010". In any other frame of 16 cycles any other individual RF cycle in each of the other possible positions could instead be of a lower frequency, thus be in a different index position, and therefore be decoded as a different binary number. See FIG. 5 for a complete decoding table where it shows that if, for further example, in the next frame of 16 cycles the RF cycle in position 4 (index count of four) were exaggerated the decoded binary number would be "0011" and so on for each of the possible 16 cycles in each subsequent 16 cycle frame. FIGS. 4a and 4b show the RF cycle of position three being modulated by amplitude and phase, respectively, as any kind of modulation of the individual RF cycle will work with the compression method of this disclosure.

In an alternative embodiment, when used in Index-N enabled systems, the clock count is used to count frames of 15 potential modulation events. Specifically, when used in ICFH systems, each cycle represents a potential modulation event, so referring to FIG. 6, 15 cycles are grouped into a frame.

Figure 6:
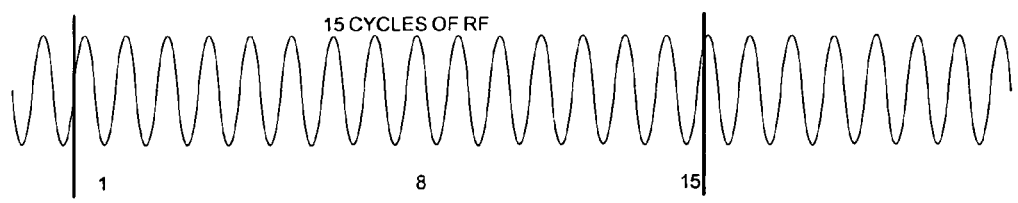
FIG. 6 is a representation of a carrier with 15 cycles counted out to define a frame of data in accordance with an alternative embodiment of the invention.

In the embodiment of FIG. 6, all cycles are the same amplitude, frequency or phase so no modulation event is detected. This frame is received and decoded as containing a binary "0000" value. The fact that no modulation event was needed to transport the binary value is important because the binary value of "0000" can be expected to occur on average $1/16^{th}$ of the time. Therefore modulation events and sideband radiation is further reduced by that amount. However, in single cycle applications, any one of the cycles could have been modulated in phase, frequency or amplitude. When used with the Index-N system rules, only one of the cycles could have been modified. In any case, the clock count forms an index pointer, working on a modulo 16 base. At the beginning of each frame, the count will reset to 1 and increment though the frame as each cycle is received to a count of 16. Decoding logic in the receiver will interpret an index count of 16 as a "no modulation event detected" and assign the binary value of "0000". If at some point in the count the receiver detects a modified cycle, the index at that cycle will indicate the binary value of a four-bit nibble.

Figure 7:
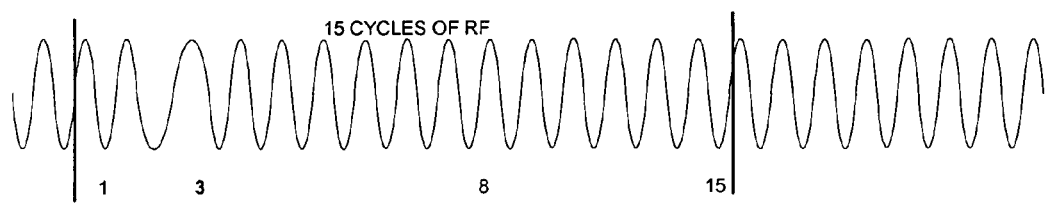
FIGS. 7, 7a, and 7b are representations of a carrier with the RF cycle in position three modulated in accordance with an alternative embodiment of the invention.
Figure 7A:
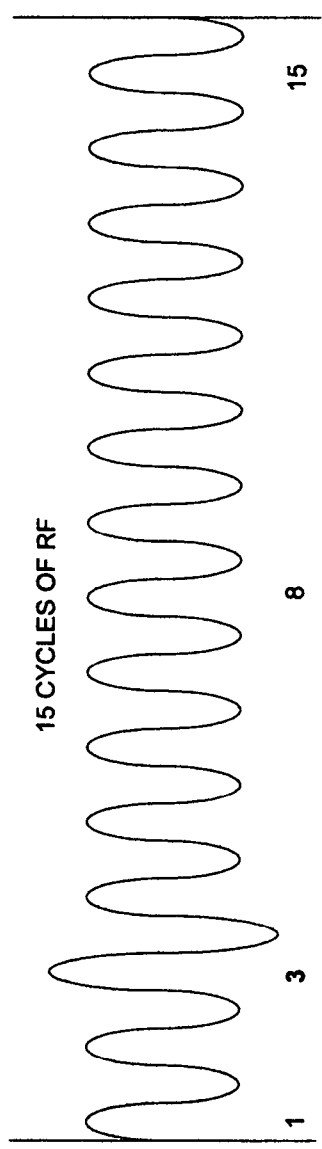
Figure 7B:
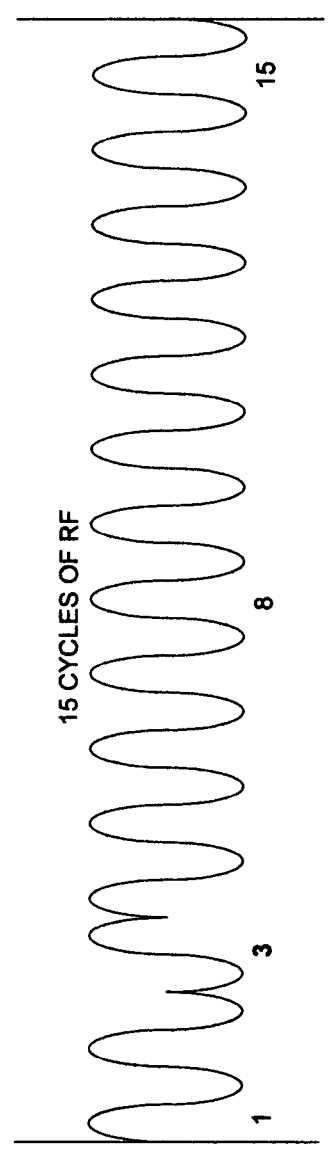

In FIG. 7, for example, the RF cycle of position three (index count of three) has a longer period, therefore is of a lower frequency than the other un-modulated cycles. The receiver will detect this single aberrated cycle and note that it is in index position three. This is decoded therefore as a binary "0011". In any other frame of 15 cycles any other individual RF cycle in each of the other possible positions could instead be of a lower frequency, thus be in a different index position, and therefore be decoded as a different binary number. See FIG. 8 for a complete decoding where it shows that if, for further example, in the next frame of 15 cycles the RF cycle in position (index count of four) were exaggerated the decoded binary number would be "0011" and so on for each of the possible 15 cycles in each subsequent 15 cycle frame.

Figure 9:
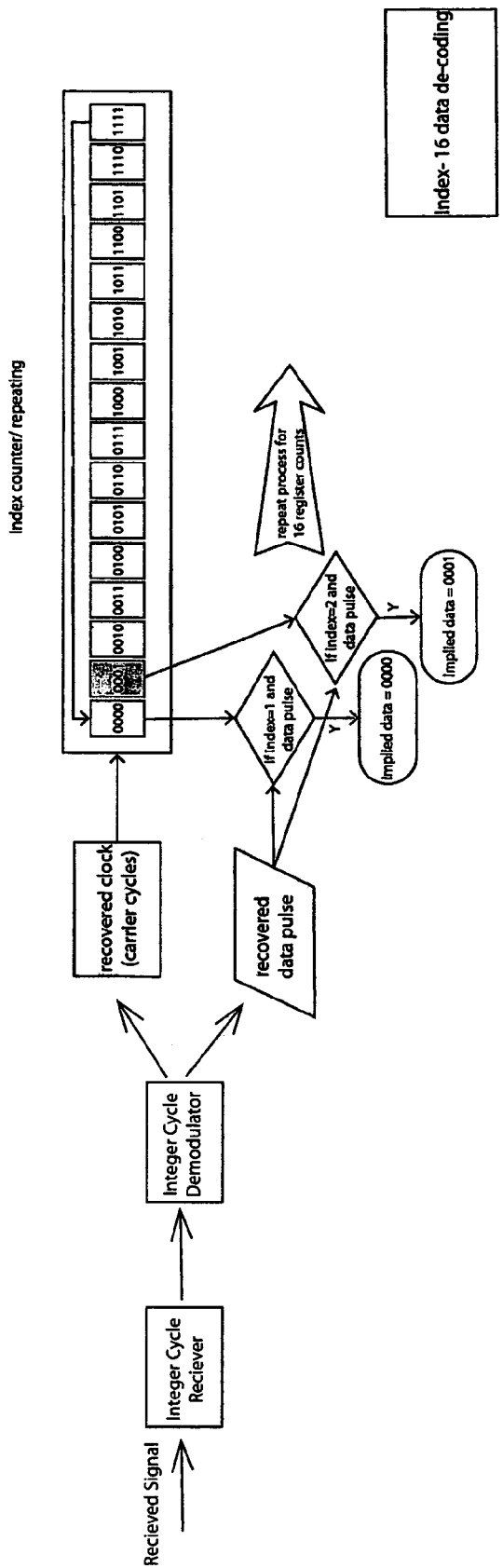
FIG. 9 is a flow chart showing compression methods for the receiver.

FIG. 9 is a flow chart representation of receiver circuitry and decompression software, easily implemented in code by one skilled in the art, that can be used as part of a modulation system to implement the above described compression methods of the invention.

Figure 10:
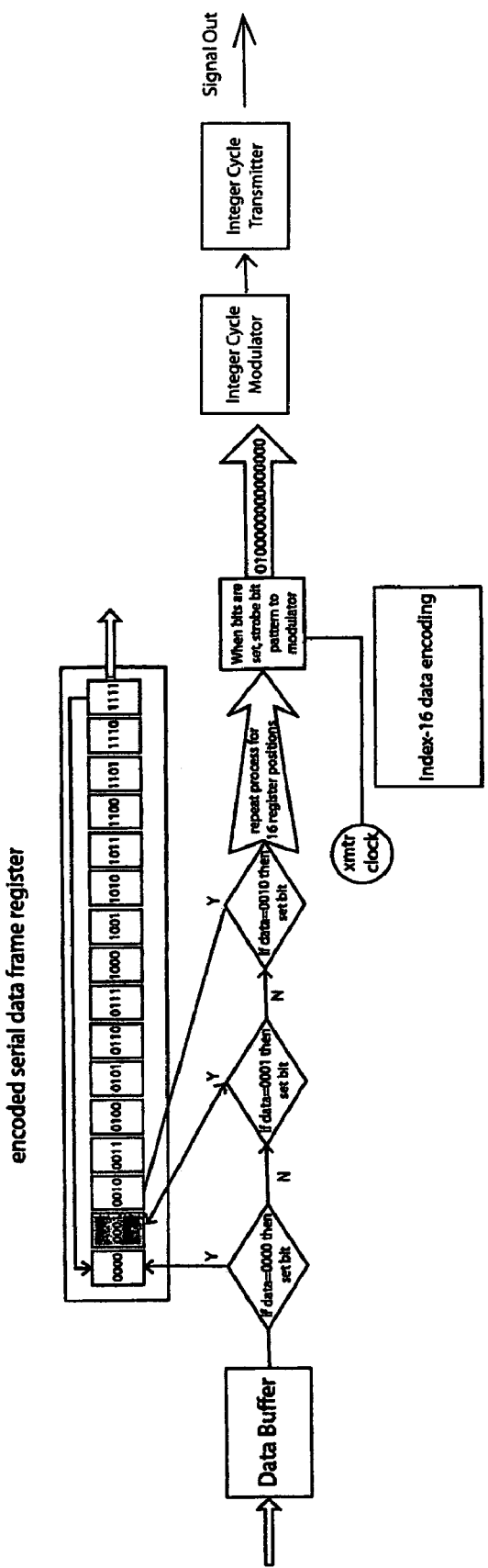
FIG. 10 is a flow chart showing compression methods for the transmitter.

FIG. 10 is a flow chart representation of the transmitter circuitry and compression software, easily implemented in code by one skilled in the art, that can be used as part of a modulation system to implement the above described compression methods of the invention.

FIG. 10 is a flow chart representation of the transmitter circuitry and compression software, easily implemented in code by one skilled in the art, that can be used as part of a modulation system to implement the above described compression methods of the invention.

The following events have been accomplished by the modulation of a single cycle of RF using Index-N:
1. A synchronous clock, formed by the transmitter and that can be used to synchronize data encoding and decoding functions in both the transmitter and receiver has been transmitted without any modulation events and therefore without transmitting any radio sidebands and using no RF spectrum and has been conveyed to the receiver.
2. A single modulation event has been transmitted causing a minimum of RF spectrum usage and generating little spectral phenomenon as sidebands.
3. Using only one modulation event in a simple two-dimensional modulation scheme, four data bits have been conveyed.
4. By eliminating the need to use a three-dimensional modulation system, such a QAM, and yet retain the ability to cause multi-bit representations with single modulation events, we reduce the system susceptibility to noise.

By requiring the use of only a single modulation event and by correlating an index counter to the relative position of that single modulation event, fully four bits of data have been conveyed where ordinarily only one could have been conveyed without Index-N. Of course it will be obvious to those skilled in the art that a modulo other than 16 could be used to transmit smaller or larger binary combinations, but the count of 16 is the preferred embodiment. More importantly, it is well understood that radio channel width is dependant upon the rate at which the carrier is modulated. By reducing the rate of modulation by a factor of four, as this example of Index-N does, so the channel width is diminish by a factor of four. This represents an impressive increase in spectral efficiency by any standard.

Although ICFH was used as the modulation scheme of the preferred embodiment, Index-N is also compatible with other modulation systems such as FSK, PSK, AFSK and the like and can be used with the Multiple Access Systems described above.

Since certain changes may be made in the above described RF signal and method without departing from the scope of the invention herein involved, it is intended that all matter contained in the description thereof or shown in the accompanying Figures shall be interpreted as illustrative and not in a limiting sense.

What is claimed is:

1. A compression method for modulation systems using integer cycle or impulse modulation on a carrier comprising the steps of:
   said wavelets being defined by a 360 degree cycle between crossover positions of said carrier waveform;
   said crossover positions representing a substantially zero energy level;
   grouping wavelets of the carrier into wavelet groups containing two or more wavelets;
   receiving an information stream as a binary data sequence of first and second binary states;
   grouping said binary data sequence of first and second binary states into binary groups of two or more first and second binary states;
   correlating one of each said wavelets in said wavelet groups with one of each possible binary values of each said binary groups; and,
   modulating said carrier in accordance with said binary data sequence by altering the amplitude, frequency, or phase of one of said wavelets in said wavelet groups corresponding to one of each said binary values of said binary groups resulting in a compressed binary modulated carrier.

2. The method of claim 1 wherein:
   the modulating of said carrier is carried out by altering the amplitude, frequency, or phase of said wavelets while minimizing sideband distortions of said carrier.

3. The method of claim 1 comprising the additional step of:
   reducing of harmonics produced from modulating said carrier by filtering said compressed binary modulated carrier.

4. The method of claim 1 comprising the additional step of:
   broadcasting said compressed binary modulated carrier.

5. The method of claim 4 wherein:
   broadcasting said compressed binary modulated carrier is accomplished using a Time Division Multiple Access system.

6. The method of claim 4 wherein:
   broadcasting said compressed binary modulated carrier is accomplished using a Frequency Division Multiple Access system.

7. A method for decompressing compressed binary information that was derived from a binary information stream composed of a binary data sequence of first and second binary states that was integer cycle or impulse modulated onto a carrier in which the carrier has been modulated in accordance with said binary data sequence by grouping said wavelets into wavelet groups containing two or more wavelets; receiving said information stream as a binary data sequence of first and second binary states; grouping said binary data sequence of first and second binary states into binary groups of two or more first and second binary states; correlating one of each said wavelets in said wavelet group with one of each possible binary values of each said binary groups; and modulating said carrier in accordance with said binary data sequence by altering the amplitude, frequency, or phase of one of said wavelets in said wavelet groups corresponding to one of each said binary values of said binary groups resulting in a compressed binary modulated carrier which was broadcasted comprising the steps of:
   receiving said broadcasted compressed binary modulated carrier;
   demodulating and decompressing said compressed binary modulated carrier by detecting the respective amplitude, frequency, or phase of said wavelets to identify said altered wavelets in said wavelet groups and correlating to said binary values of said binary groups ; and,
   reconstructing said binary data sequence from said binary values of said binary groups resulting in regeneration of said information stream.

8. The method of claim 7 wherein:
   broadcasting and receiving said compressed binary modulated carrier is accomplished using a Time Division Multiple Access system.

9. The method of claim 7 wherein:
   broadcasting and receiving said compressed binary modulated carrier is accomplished using a Frequency Division Multiple Access system.

10. A compression and decompression method for modulation systems using integer cycle or impulse modulation on a carrier comprising the steps of:
    grouping wavelets of the carrier into wavelet groups containing two or more wavelets;

receiving an information stream as a binary data sequence of first and second binary states;

grouping said binary data sequence of first and second binary states into binary groups of two or more first and second binary states;

correlating one of each said wavelets in said wavelet group with one of each possible binary values of each said binary groups; and, modulating said carrier in accordance with said binary data sequence by altering the amplitude, frequency, or phase of one of said wavelets in said wavelet groups corresponding to one of each said binary values of said binary groups resulting in a compressed binary modulated carrier;

broadcasting said compressed binary modulated carrier;

receiving said compressed binary modulated carrier;

demodulating and decompressing said compressed binary modulated carrier by detecting the respective amplitude, frequency, or phase of said wavelets to identify said altered wavelets in said wavelet groups and correlating to said binary values of said binary groups; and, reconstructing said binary data sequence from said binary values of said binary groups resulting in regeneration of said information stream.

11. The method of claim 10 wherein:

the modulating of carrier is carried out by altering the amplitude, frequency or phase of said wavelets while minimizing sideband distortions of said carrier.

12. The method of claim 10 comprising the additional step of:

reducing of harmonics produced by modulating said carrier by filtering said carrier.

13. The method of claim 10 wherein:

broadcasting and receiving said compressed binary modulated carrier is accomplished using a Time Division Multiple Access system.

14. The method of claim 10 wherein:

broadcasting and receiving said compressed binary modulated carrier is accomplished using a Frequency Division Multiple Access system.

* * * * *